United States Patent
Nomaru

(10) Patent No.: US 11,027,371 B2
(45) Date of Patent: Jun. 8, 2021

(54) LASER APPLYING MECHANISM

(71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 238 days.

(21) Appl. No.: 16/145,860

(22) Filed: Sep. 28, 2018

(65) Prior Publication Data

US 2019/0099839 A1    Apr. 4, 2019

(30) Foreign Application Priority Data

Oct. 3, 2017 (JP) .............................. JP2017-193549

(51) Int. Cl.
| | |
|---|---|
| *B23K 26/40* | (2014.01) |
| *H01S 3/10* | (2006.01) |
| *G02B 27/28* | (2006.01) |
| *G02F 1/33* | (2006.01) |
| *B23K 26/0622* | (2014.01) |
| *H01S 3/23* | (2006.01) |

(Continued)

(52) U.S. Cl.
CPC .......... *B23K 26/40* (2013.01); *B23K 26/0622* (2015.10); *G02B 27/283* (2013.01); *G02F 1/33* (2013.01); *H01S 3/1003* (2013.01); *H01S 3/10046* (2013.01); *H01S 3/10061* (2013.01); *H01S 3/2308* (2013.01); *B23K 26/0853* (2013.01); *B23K 2101/40* (2018.08); *H01S 3/08009* (2013.01); *H01S 3/2383* (2013.01)

(58) Field of Classification Search
CPC ............ B23K 2101/40; B23K 2101/42; B23K 2103/56; B23K 26/032; B23K 26/0622; B23K 26/0648; B23K 26/0853; B23K 26/38; B23K 26/40; G02B 27/283; G02F 1/33; H01S 3/08009; H01S 3/1003; H01S 3/10046; H01S 3/10061; H01S 3/2308; H01S 3/2383

USPC .................................................... 219/121.61
See application file for complete search history.

(56) References Cited

U.S. PATENT DOCUMENTS

| | | | | |
|---|---|---|---|---|
| 2009/0245301 A1* | 10/2009 | Peng | .................. | B23K 26/0622 372/25 |
| 2011/0267671 A1* | 11/2011 | Peng | ....................... | H01S 3/115 359/257 |

FOREIGN PATENT DOCUMENTS

| | | | |
|---|---|---|---|
| JP | 10305420 A | 11/1998 | |
| JP | 11188490 A | 7/1999 | |

(Continued)

*Primary Examiner* — Dana Ross
*Assistant Examiner* — Joseph W Iskra
(74) *Attorney, Agent, or Firm* — Greer, Burns & Crain, Ltd.

(57) ABSTRACT

A laser applying mechanism which has a laser oscillator adapted to oscillate a pulsed laser and to emit a linearly polarized pulsed laser beam. The laser applying mechanism includes: a polarization plane composing unit adapted to selectively synthesize a pulsed laser beam having a second polarization plane rotated by 90 degrees with respect to a pulsed laser beam having a first polarization plane which is emitted from the laser oscillator; an amplifier adapted to amplify a power of the pulsed laser beam composed by the polarization plane composing unit; and a pulsed laser beam extracting unit adapted to extract a pulsed laser beam having a polarization plane to be utilized, from among the pulsed laser beam having the first polarization plane and the pulsed laser beam having the second polarization plane which are contained in the pulsed laser beam amplified by the amplifier.

4 Claims, 4 Drawing Sheets

(51) Int. Cl.
*B23K 26/08* (2014.01)
*B23K 101/40* (2006.01)
*H01S 3/08* (2006.01)

(56) References Cited

FOREIGN PATENT DOCUMENTS

JP  2002192370 A  7/2002
JP  2014221483 A  11/2014

* cited by examiner

LASER APPLYING MECHANISM

BACKGROUND OF THE INVENTION

Field of the Invention

The present invention relates to a laser applying mechanism capable of applying a pulsed laser beam with amplification to an appropriate power.

Description of the Related Art

A wafer in which a plurality of devices such as integrated circuits (ICs) and large-scale integrations (LSIs) are formed on a front surface partitioned by division lines (streets) is divided into individual device chips by a laser processing apparatus, and the thus divided device chips are utilized for electric apparatuses such as mobile phones and personal computers.

As the laser processing apparatus, there have been known, for example, those of the following three types.

(1) A type wherein a laser beam of such a wavelength as to be absorbed in a workpiece is applied to the workpiece, with a focal point of the laser beam positioned on a front surface of the workpiece, to form dividing grooves through so-called ablation (see, for example, Japanese Patent Laid-open No. Hei 10-305420).

(2) A type wherein a laser beam of such a wavelength as to be transmitted through a workpiece is applied to the workpiece, with a focal point of the laser beam positioned in the inside of the workpiece, to form in the inside of the workpiece modified layers which will serve as starting points of division (see, for example, Japanese Patent No. 3408805).

(3) A type wherein a laser beam of such a wavelength as to be transmitted through a workpiece is applied to the workpiece, with a focal point of the laser beam positioned in the inside of the workpiece, to form a plurality of shield tunnels each composed of a thin hole extending from a front surface to a back surface of the workpiece and an amorphous portion surrounding the thin hole (see, for example, Japanese Patent Laid-open No. 2014-221483).

In addition, there has been proposed a pulsed laser beam applying technology in which in order to apply a desired laser beam to a workpiece, a laser beam oscillated from a laser oscillator in a pulsed form is selectively thinned out, and the start and stop of application of the pulsed laser beam to the workpiece can be controlled appropriately (see, for example, Japanese Patent Laid-open No. Hei 11-188490).

SUMMARY OF THE INVENTION

According to the pulsed laser beam applying technology described in Japanese Patent Laid-open No. Hei 11-188490, the pulsed laser beam can be selectively thinned out, and the pulsed laser beam can be applied to the workpiece while repeating the start and stop of application of the pulsed laser beam at arbitrary timings. However, when the power of the pulsed laser beam after thinning-out at predetermined intervals is amplified by an amplifier, the first pulsed laser beam after the thinning-out of the pulsed laser beam applied intermittently may pick up the energy having been accumulated in the amplifier during the stoppage of the application of the pulsed laser beam, and abnormal amplification of power may be generated temporarily. Then, a pulsed laser beam with an output unsuited to processing conditions for the workpiece may be applied to the workpiece, making it impossible to perform desired processing. This problem is generated not only in the cases where the pulsed laser beam applying technology described in the Japanese Patent Laid-open No. Hei 11-188490 is applied to Japanese Patent Laid-open No. Hei 10-305420, Japanese Patent No. 3408805, and Japanese Patent Laid-open No. 2014-221438, but also in the cases of performing inspection or measurement of a workpiece by applying a pulsed laser beam, since the output of the pulsed laser beam may be unsuited for desired inspection conditions or measurement conditions.

It is therefore an object of the present invention to provide a laser applying mechanism capable of amplifying a pulsed laser beam to appropriate power by an amplifier, even in the case where a pulsed laser beam is intermittently applied through thinning-out.

In accordance with an aspect of the present invention, there is provided a laser applying mechanism having a laser oscillator adapted to oscillate a pulsed laser and to emit a linearly polarized pulsed laser beam, the laser applying mechanism comprising: polarization plane composing means selectively composing a pulsed laser beam having a second polarization plane rotated by 90 degrees with respect to a pulsed laser beam having a first polarization plane emitted from the laser oscillator; an amplifier adapted to amplify a power of the pulsed laser beam composed by the polarization plane composing means; and pulsed laser beam extracting means extracting a pulsed laser beam having a polarization plane to be utilized, from among the pulsed laser beam having the first polarization plane and the pulsed laser beam having the second polarization plane which are contained in the pulsed laser beam amplified by the amplifier.

Preferably, the polarization plane composing means includes an EOM, the pulsed laser beam emitted from the laser oscillator is selectively converted into the pulsed laser beam having the second polarization plane by the EOM, to synthesize the pulsed laser beam having the first polarization plane and the pulsed laser beam having the second polarization plane, the extracting means includes a polarization beam splitter, and the polarization beam splitter extracts the pulsed laser beam having the first polarization plane and the pulsed laser beam having the second polarization plane in forms of p-polarized light and s-polarized light.

Preferably, the polarization plane composing means includes an AOD adapted to selectively branch an optical path of the pulsed laser beam, and a polarization plane rotator that is disposed in the optical path branched by the AOD and is adapted to convert the pulsed laser beam having the first polarization plane into the pulsed laser beam having the second polarization plane, the extracting means includes a polarization beam splitter, and the polarization beam splitter extracts the pulsed laser beam having the first polarization plane and the pulsed laser beam having the second polarization plane in forms of p-polarized light and s-polarized light.

Preferably, the polarization plane rotator includes a halfwave plate that is disposed in the optical path branched by the AOD and is adapted to rotate the polarization plane of the pulsed laser beam having the first polarization plane into the second polarization plane, and a composing polarization beam splitter adapted to synthesize the pulsed laser beam having the first polarization plane and the pulsed laser beam having the second polarization plane. Preferably, the AOD controls power ratio between the pulsed laser beam having the first polarization plane and the pulsed laser beam having the second polarization plane.

Preferably, the laser oscillator includes a first laser oscillator adapted to oscillate the pulsed laser having the first polarization plane, and a second laser oscillator adapted to oscillate the pulsed laser having the second polarization plane rotated by 90 degrees with respect to the first polarization plane, the polarization plane composing means controls the first laser oscillator and the second oscillator to selectively synthesize the pulsed laser beam having the first polarization plane and the pulsed laser beam having the second polarization plane, the extracting means includes a polarization beam splitter, and the polarization beam splitter extracts the pulsed laser beam having the first polarization plane and the pulsed laser beam having the second polarization plane in forms of p-polarized light and s-polarized light. Preferably, the polarization plane composing means includes a control section, and a composing polarization beam splitter, and the composing polarization beam splitter selectively composes the pulsed laser beam having the first polarization plane and the pulsed laser beam having the second polarization plane which are selected by the control section.

According to the present invention, the pulsed laser beam incident on the amplifier is not intermittently stopped; therefore, accumulation of energy in the amplifier would not occur, and the power of the pulsed laser beam amplified by the amplifier would not be abnormally amplified. Consequently, application of a pulsed laser beam amplified abnormally, and unsuited for processing of a workpiece, to the workpiece is prevented.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
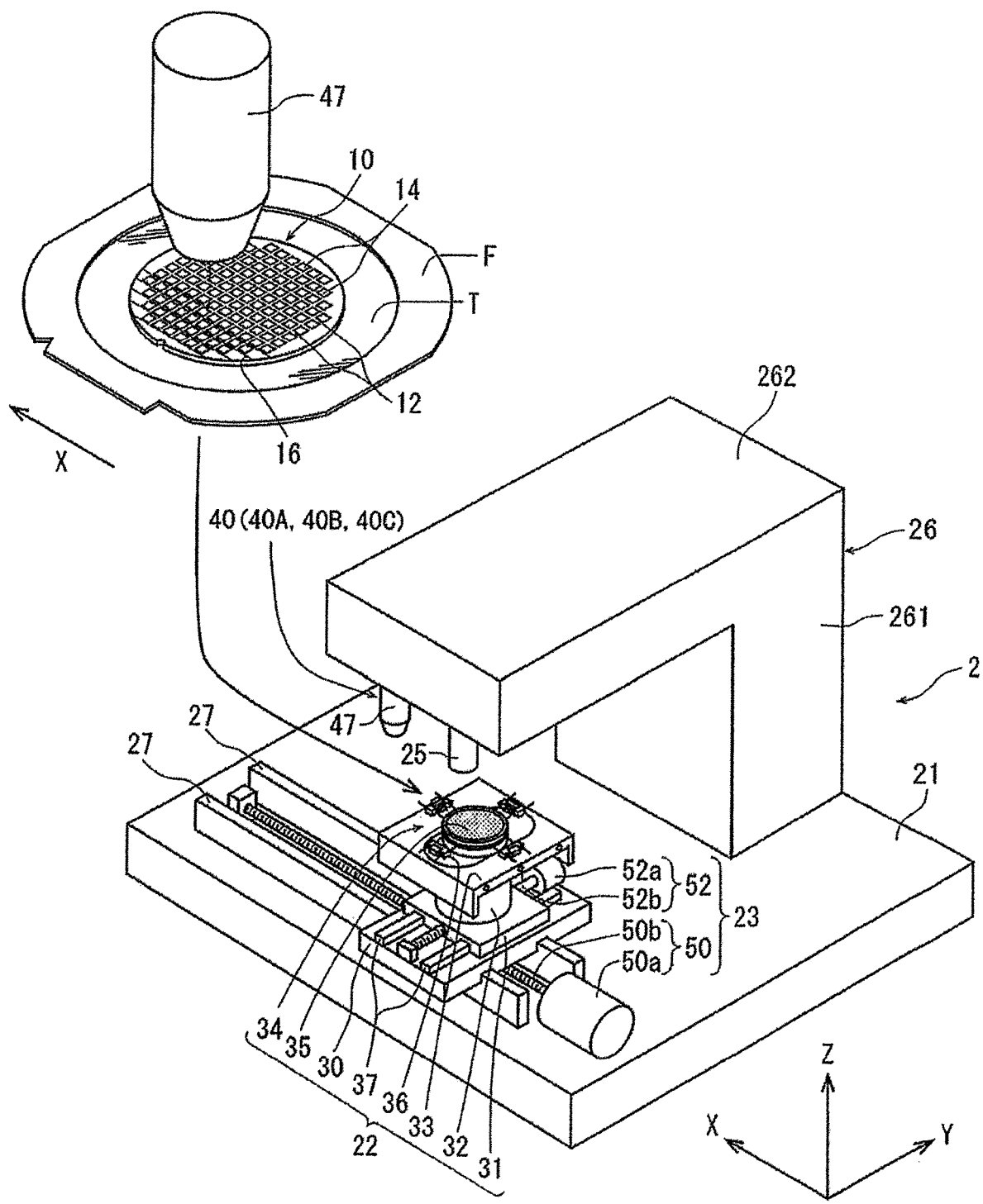
FIG. 1 is a perspective view of a laser processing apparatus according to the present embodiment.

Embodiments of the present invention will be described below, referring to the attached drawings. FIG. 1 depicts a perspective view of a laser processing apparatus 2 in which a laser applying mechanism according to an embodiment of the present invention is adopted. The laser processing apparatus 2 depicted in FIG. 1 includes holding means 22 for holding a workpiece, moving means 23 that is disposed on a base 21 and moves the holding means 22, and a frame body 26 that includes a vertical wall section 261 erected in a Z-direction indicated by arrow Z on a lateral side of the moving means 23 on the base 21, and a horizontal wall section 262 extending in a horizontal direction from an upper end portion of the vertical wall section 261.

In the inside of the horizontal wall section 262 of the frame body 26 is disposed an optical system constituting a laser applying mechanism 40 adapted to apply a pulsed laser beam to the workpiece (wafer 10) held by the holding means 22. On a lower surface side of a tip portion of the horizontal wall section 262, a condenser 47 constituting part of the laser applying mechanism 40 is disposed, and imaging means 25 located adjacently to the condenser 47, in a direction indicated by arrow X in the figure, is disposed.

The imaging means 25 includes an imaging element charge-coupled device (CCD) using visible rays for imaging a surface of the workpiece. Depending on the kind of the workpiece, it is preferable for the imaging means 25 to include infrared (IR) ray applying means applying IR rays, an optical system for capturing the IR rays applied by the IR ray applying means, and an imaging element (IR CCD) for outputting an electrical signal corresponding to the IR rays captured by the optical system.

The holding means 22 includes: a rectangular X-direction movable plate 30 mounted on the base 21 so as to be movable in the X-direction indicated by arrow X in FIG. 1; a rectangular Y-direction movable plate 31 mounted on the X-direction movable plate 30 so as to be movable in a Y-direction indicated by arrow Y in FIG. 1; a cylindrical support column 32 fixed to an upper surface of the Y-direction movable plate 31; and a rectangular cover plate 33 fixed to an upper end of the support column 32. On the cover plate 33 is disposed a chuck table 34 which extends upward through a slot formed over the cover plate 33, holds the circular workpiece, and is configured to be rotatable by rotational driving means (not depicted). At an upper surface of the chuck table 34 is disposed a circular suction chuck 35 formed from a porous material and extending substantially horizontally. The suction chuck 35 is connected to suction means (not depicted) through a passage passing within the support column 32, and four clamps 36 are evenly disposed in the surroundings of the suction chuck 35. The clamps 36 grasp a frame F that holds the wafer 10 as the workpiece through a protective tape T, at the time of fixing the wafer 10 to the chuck table 34. The X-direction is the direction indicated by arrow X in FIG. 1, and the Y-direction is the direction indicated by arrow Y, which is the direction orthogonal to the X-direction. A plane defined by the X-direction and the Y-direction is substantially horizontal.

The moving means 23 includes X-direction moving means 50 and Y-direction moving means 52. The X-direction moving means 50 converts a rotational motion of a motor 50a into a rectilinear motion through a ball screw 50b, and transmits the rectilinear motion to the X-direction movable plate 30, thereby advancing or retracting the X-direction movable plate 30 in the X-direction along guide rails 27 on the base 21. The Y-direction moving means 52 converts a rotational motion of a motor 52a into a rectilinear motion through a ball screw 52b, and transmits the rectilinear motion to the Y-direction movable plate 31, thereby advancing or retracting the Y-direction movable plate 31 in the Y-direction along guide rails 37 on the X-direction movable plate 30. Note that though illustration is omitted, the X-direction moving means 50 and the Y-direction moving means 52 are provided respectively with position detecting means, whereby the position in the X-direction, the position in the Y-direction, and a rotational position in the circumferential direction of the chuck table 34 are detected, and, with the X-direction moving means 50, the Y-direction moving means 52, and rotational driving means (not depicted) driven, the chuck table 34 can be accurately positioned into an arbitrary position and an arbitrary angle.

Note that in an actual processing state, the laser processing apparatus 2 as a whole and the moving means 23 and the like are covered by a bellows cover, a housing and the like, which are omitted from illustration for convenience of explanation, such that dust and the like are prevented from entering them.

Figure 2:
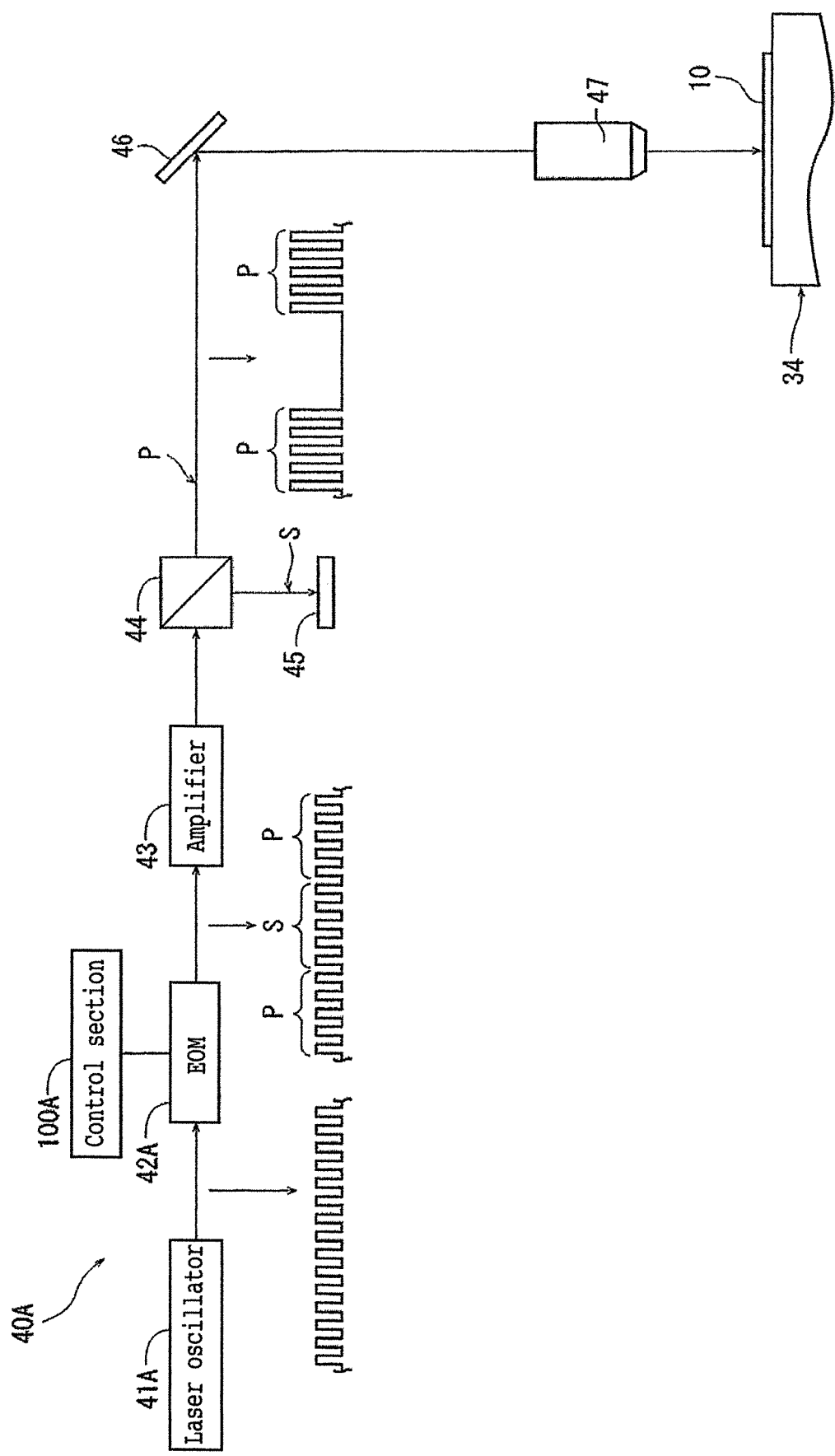
FIG. 2 is a block diagram depicting a first embodiment of a laser applying mechanism provided in the laser processing apparatus depicted in FIG. 1.

Referring to FIG. 2, the optical system of the laser applying mechanism 40A as a first embodiment of the laser applying apparatus 40 according to the present embodiment will be described. The laser applying mechanism 40A includes: a laser oscillator 41A adapted to oscillate a pulsed laser; an electro-optical modulator (EOM) 42A adapted to function as polarization plane composing means; an amplifier 43 adapted to amplify the power of an incident pulsed laser beam; and a polarization beam splitter 44 adapted to function as pulsed laser beam extracting means extracting a pulsed laser beam of a polarization plane to be utilized from among the pulsed laser beams amplified by the amplifier 43. Further, if necessary, the laser applying mechanism 40A includes: a beam damper 45 which is branched from the polarization beam splitter 44 and to which a pulsed laser beam having a polarization plane not to be utilized is applied; a reflection mirror 46 adapted to reflect the pulsed laser beam having the polarization plane to be utilized; a condenser 47 adapted to condense the pulsed laser beam to the workpiece (wafer 10) suction held on the chuck table 34; and the like. Note that in the present embodiment, the pulsed laser beam having a first polarization plane is a pulsed laser beam of p-polarized light, whereas the pulsed laser beam having a second polarization plane is a pulsed laser beam of s-polarized light.

The laser oscillator 41A oscillates a pulsed laser having a desired oscillation frequency and emit a linearly polarized pulsed laser beam. As the laser oscillator 41A, there may be used, for example, one that oscillates a pulsed laser with a repetition frequency of 10 MHz to 10 KHz and an average output of 0.1 W. The pulsed laser beam emitted from the laser oscillator 41A is a pulsed laser beam before amplified.

The EOM 42A is controlled by a control section 100A. The direction of an electric field applied to a non-linear crystal contained in the EOM 42A is controlled by the control section 100A, whereby the polarized state of the incident pulsed laser beam can be arbitrarily selectively modulated (polarization modulation). By this, as illustrated in FIG. 2, the pulsed laser beam having the first polarization plane incident on the EOM 42A is modulated, selectively on the basis of a predetermined number of pulses, for example, five pulses, into the pulsed laser beam having the second polarization plane rotated by 90 degrees with respect to the first polarization plane, and is emitted in a state in which pulsed laser beams of p-polarized light and s-polarized light are composed. The EOM 42A functions as polarization plane composing means selectively composing the pulsed laser beam having the second polarization plane rotated by 90 degrees with respect to the pulsed laser beam having the first polarization plane which is emitted from the laser oscillator 41A. Note that the control section 100A is a computer which is provided in the laser processing apparatus 2 and which controls each of means provided in the laser processing apparatus 2, for example, the imaging means 25.

The amplifier 43 amplifies the power of the pulsed laser beam emitted from the EOM 42A; for example, a pulsed laser beam of 0.1 W emitted from the laser oscillator 41A is amplified to a power of 5.0 W by the amplifier 43.

The polarization beam splitter 44 is, for example, a cubic type polarization beam splitter, which is generally known as an optical part for branching incident light into p-polarized light and s-polarized light. By this, the pulsed laser beam guided from the amplifier 43 is branched into a pulsed laser beam having the first polarization plane (p-polarized light) and a pulsed laser beam having the second polarization plane (s-polarized light). The pulsed laser beam having the polarization plane (p-polarized light) to be utilized is extracted into an optical path on one side, or an optical path on which the reflection mirror 46 and the condenser 47 are disposed. Note that the pulsed laser beam of s-polarized light not to be utilized is guided into an optical path on the other side, to be absorbed by the beam damper 45. The pulsed laser beam of the p-polarized light guided to the condenser 47 is applied to the wafer 10 held by the chuck table 34, whereby desired processing is performed.

The laser processing apparatus 2 and the laser applying mechanism 40A according to the present embodiment are generally configured as above-described, and specific operations of them will be described below. First, as depicted at left upper side of FIG. 1, the substantially circular wafer 10 as the workpiece is prepared. The wafer 10 is formed from Si (silicon), and a plurality of devices 14 are formed in device regions partitioned by a plurality of crossing division lines (streets) 12 on a front surface of the wafer 10. A back surface of the wafer 10 is adhered to a dicing tape T, in a state in which the wafer 10 is accommodated by a frame F having an opening for accommodating the wafer 10, whereby the wafer 10 is supported by the frame F.

Next, the wafer 10 is mounted on the suction chuck 35 of the chuck table 34, and is fixed by causing the four clamps 36 to act on the frame F supporting the wafer 10. Further, a suction force is made to act at the suction chuck 35 of the chuck table 34, whereby the wafer 10 is suction held.

Subsequently, ablation processing for forming dividing grooves which serve as starting points of division is applied to the front surface of the wafer 10 held on the chuck table 34. The formation of the dividing grooves is specifically carried out according to the following procedure.

After the wafer 10 is held on the chuck table 34, processing feeding means 23 is operated to position the chuck table 34 to a position beneath the imaging means 25. After the chuck table 34 is positioned at the position beneath the imaging means 25, an alignment operation of detecting a processing region of the wafer 10 to be laser processed is performed by the imaging means 25 and the control section 100A. Specifically, the imaging means 25 and the control section 100A perform image processing, such as pattern matching, for alignment between the condenser 47 of the laser applying mechanism 40A for applying the laser beam along the division line 12 of the wafer 10 and the processing region of the wafer 10, whereby alignment of the laser beam applying position is performed.

After the above-mentioned alignment is conducted, dividing groove forming processing is carried out in which as depicted in FIG. 1, a laser beam of such a wavelength as to be absorbed in the wafer 10 is applied to the wafer 10 along the division lines 12, to form dividing grooves 16 in the front surface of the wafer 10. More specifically, the chuck table 34 is moved into a laser beam applying region where the condenser 47 of the laser applying mechanism 40A for applying the laser beam is located, and one end of a predetermined division line 12 is positioned to the position beneath the condenser 47. Next, while applying the pulsed laser beam of such a wavelength as to be absorbed in the wafer 10 from the condenser 47 of the laser applying mechanism 40A, with a foal point of the laser beam applied from the condenser 47 being positioned on the front surface of the wafer 10, the chuck table 34 is moved at a predetermined processing feeding velocity in the direction indicated by arrow X in the figure, until the other end of the division line 12 is reached. Such a processing is repeated along all the division lines 12 while operating the holding means 22 and the moving means 23, whereby laser processing for forming the dividing grooves 16 along all the division lines 12 is performed.

Here, the operation of the laser applying mechanism 40A as above will be described specifically.

As has been described based on FIG. 2, the pulsed laser beam of p-polarized light extracted by the polarization beam splitter 44 is applied in a state where the pulsed laser beam of s-polarized light is thinned out, and is thus intermittently applied to the wafer 10. Here, the EOM 42A disposed in the laser applying mechanism 40A applies to the amplifier 43 the pulsed laser beam in the state in which the pulsed laser beams of p-polarized light and s-polarized light are composed; therefore, the pulsed laser beam of p-polarized light and s-polarized light is continuously guided to the amplifier 43, to be amplified.

The pulsed laser beam amplified by the amplifier 43 is guided to the polarization beam splitter 44, and is branched into a pulsed laser beam of p-polarized light to be utilized for laser processing and a pulsed laser beam of s-polarized light not to be utilized for laser processing. In this way, of the continuous pulsed laser beam, only the pulsed laser beam of p-polarized light to be utilized is guided to the reflection mirror 46. Note that the pulsed laser beam of s-polarized light not to be utilized is guided to, and absorbed by, the beam damper 45. Then, the pulsed laser beam of p-polarized light whose optical path direction is changed by the reflection mirror 46 is guided to the condenser 47, and is applied to the wafer 10.

With the laser applying mechanism 40A configured in this way, the pulsed laser beam incident on the amplifier 43 is not stopped intermittently; therefore, accumulation of energy in the amplifier 43 would not occur, and the power of the pulsed laser beam amplified by the amplifier 43 would not be amplified abnormally. Consequently, application of a pulsed laser beam abnormally amplified, and unsuited for processing of the wafer 10, to the wafer 10 is prevented.

Figure 3:
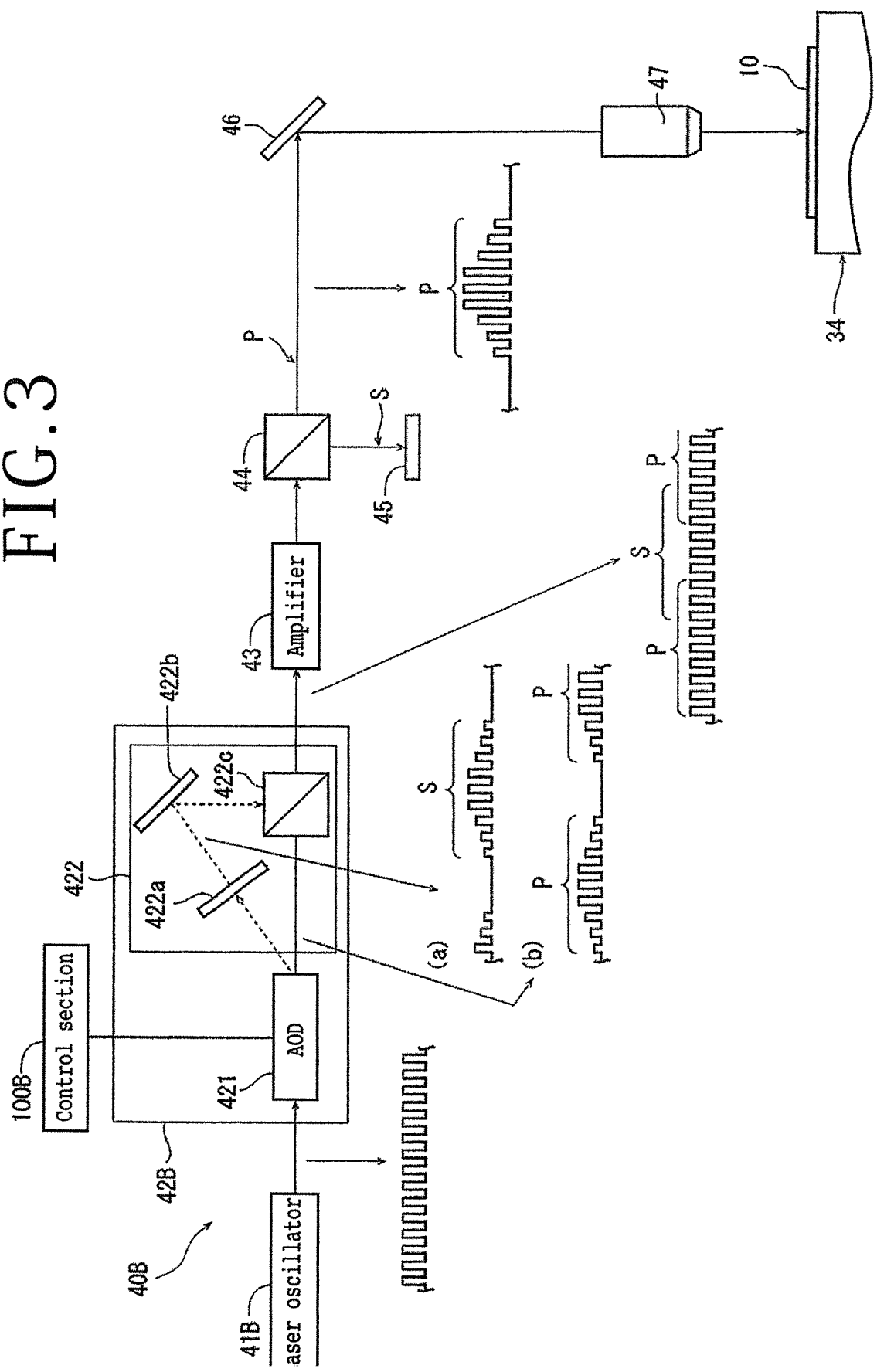
FIG. 3 is a block diagram depicting a second embodiment of the laser applying mechanism provided in the laser processing apparatus depicted in FIG. 1.

The laser applying mechanism 40 of the present invention is not limited to the configuration of the laser applying mechanism 40A of the first embodiment above, and various modifications may be provided. Referring to FIG. 3, a laser applying mechanism 40B as a second embodiment of the laser applying mechanism 40 will be described below. Note that the components denoted by the same reference symbols as used in the first embodiment depicted in FIG. 2 are the same or similar in function and operation as the components in the first embodiment, and, therefore, detailed description of them will be omitted appropriately.

The laser applying mechanism 40B includes: a laser oscillator 41B adapted to oscillate a pulsed laser; polarization plane composing means 42B; an amplifier 43 adapted to amplify the power of an incident pulsed laser beam; and a polarization beam splitter 44 adapted to function as pulsed laser beam extracting means extracting a pulsed laser beam having a polarization plane to be utilized. Like in the first embodiment, the laser applying mechanism 40B further includes; a beam damper 45 which is branched from the polarization beam splitter 44 and to which a pulsed laser beam having a polarization plane not to be utilized is applied; a reflection mirror 46 adapted to reflect the pulsed laser beam; a condenser 47 adapted to condense the pulsed laser beam to the workpiece (wafer 10) suction held on the chuck table 34; and the like.

Like in the first embodiment, the laser oscillator 41B oscillates a pulsed laser having a desired oscillation frequency and emits a linearly polarized pulsed laser beam. As the laser oscillator 41B, there may be used, for example, one that oscillates a pulsed laser with a repetition frequency of 10 MHz to 10 KHz and an average output of 0.1 W. The pulsed laser beam applied from the laser oscillator 41B is a pulsed laser beam before amplified.

The polarization plane composing means 42B includes an acousto-optic device (AOD) 421 and a polarization plane rotator 422. The AOD 421 is a generally known device, in which a crystal is vibrated by a piezoelectric element, to produce a compressional stationary wave in the crystal, and which functions with this as a diffraction grating. The vibration frequency is controlled by a control section 100B, and the width of a grating formed in the crystal is varied by varying the vibration frequency. With the grating width varied, the angles of beams branched by the diffraction grating and the ratio of power can be controlled. As depicted in FIG. 3, the pulsed laser beam incident on the AOD 421 is branched, on the basis of a predetermined number of pulses, into two directions of solid line and dotted line, at a predetermined angle, and guided to the polarization plane rotator 422. Note that the pulsed laser beams applied from the AOD 421 in this instance are each a pulsed laser beam in which the first polarization plane oscillated by the laser oscillator 421 is maintained.

As depicted in FIG. 3, the polarization plane rotator 422 includes: a half-wave plate 422a; a reflection mirror 422b; and a composing polarization beam splitter 422c. One of the pulsed laser beams branched by the AOD 421 which is indicated by dotted line is guided to the half-wave plate 422a. The pulsed laser beam having the first polarization plane which is guided to the half-wave plate 422a has its polarization plane rotated by 90 degrees, to be a pulsed laser beam having the second polarization plane rotated by 90 degrees with respect to the pulsed laser beam having the first polarization plane which is indicated by solid line. As a result, the pulsed laser beam having the first polarization plane becomes a pulsed layer beam of s-polarized light as represented by (a) in FIG. 3, whereas the pulsed laser beam having the second polarization plane becomes a pulsed layer beam of p-polarized light as represented by (b) in FIG. 3.

The pulsed laser beam of s-polarized light branched by the AOD 421 and having the polarization plane rotated is reflected by the reflection mirror 422b, to be guided to the composing polarization beam splitter 422c. In addition, the pulsed laser beam of p-polarized light having the polarization plane maintained is also guided to the composing polarization beam splitter 422c, where the two pulsed laser beams are composed, and the resulting pulsed laser beam is emitted from the polarization plane composing means 42B. As illustrated in FIG. 3, the pulsed laser beam emitted from the polarization plane composing means 42B has the same repetition frequency as that of the pulsed laser beam incident on the polarization plane composing means 42B, but has been so composed that its polarization plane varies between p-polarized light and s-polarized light on the basis of a predetermined number of pulses. The pulsed laser beam thus composed is guided to the amplifier 43, like in the first embodiment.

The pulsed laser beam in a state in which the pulsed laser beams of p-polarized light and s-polarized light have been composed is guided to the amplifier 43 in a continuous pulsed form, and its power is amplified, for example, to an average output of 5.0 W.

The pulsed laser beam amplified by the amplifier 43 is guided to the polarization beam splitter 44 through an optical path which is the same or similar to that in the first embodiment, then the pulsed laser beam of p-polarized light is extracted, is guided to the reflection mirror 46 and is applied to the wafer 10. Note that as understood from (a) in FIG. 3 and (b) in FIG. 3, in this embodiment, the power at the time of branching the pulsed laser beam is gradually varied by the function of the AOD 421.

With the laser applying mechanism 40B configured in this way, the pulsed laser beam incident on the amplifier 43 is not intermittently stopped, and, therefore, accumulation of energy in the amplifier 43 would not occur, and the power of the pulsed laser beam amplified by the amplifier 43 is prevented from being abnormally amplified.

Figure 4:
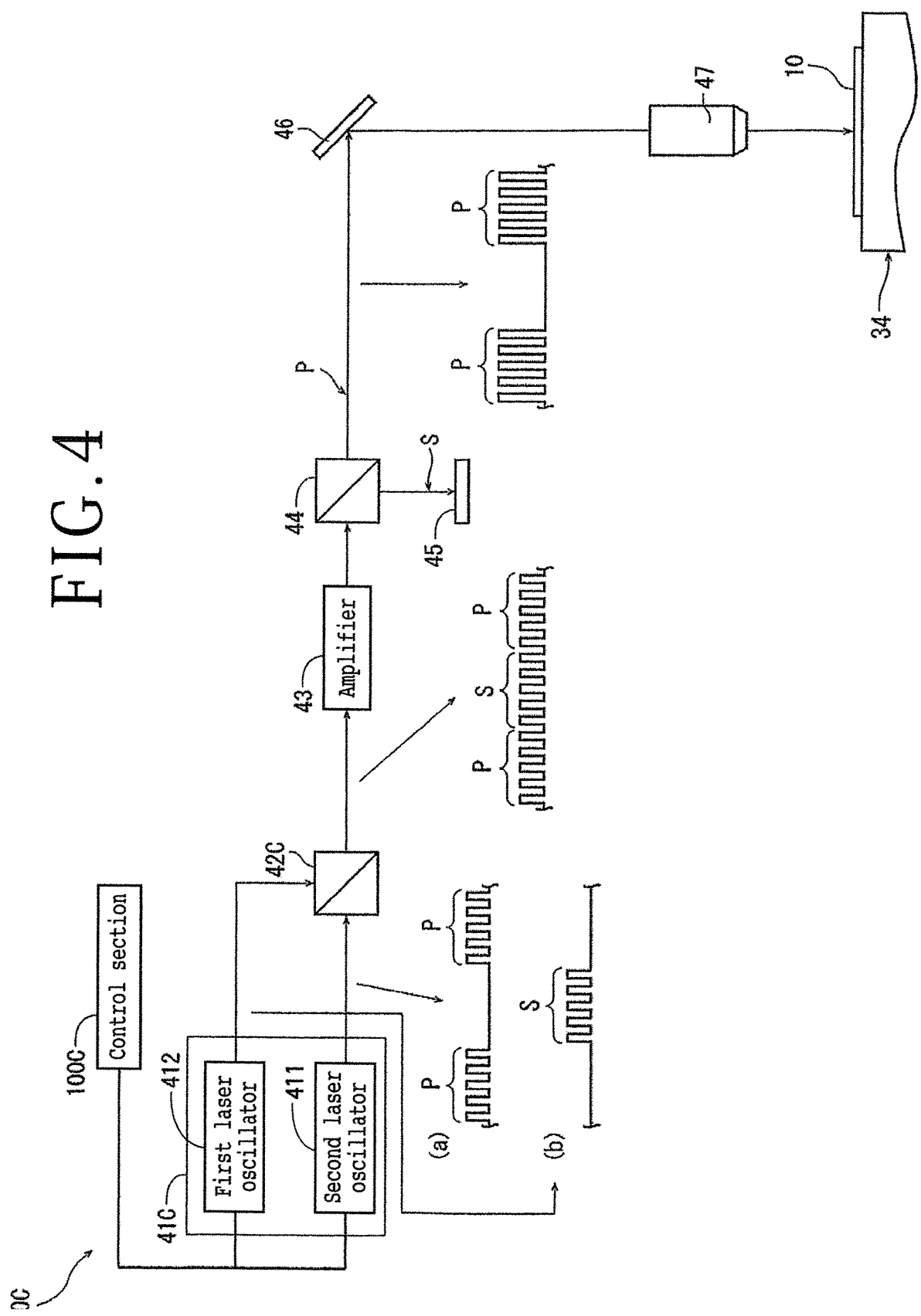
FIG. 4 is a block diagram depicting a third embodiment of the laser applying mechanism provided in the laser processing apparatus depicted in FIG. 1.

Further, referring to FIG. 4, a laser applying mechanism 40C as a third embodiment of the layer applying mechanism 40 will be described. Note that the components denoted by the same reference symbols as used in the first embodiment depicted in FIG. 2 and the second embodiment depicted in FIG. 3 are the same or similar in function and operation to the components in the above embodiments, and, therefore, detailed descriptions of them will be omitted appropriately.

The laser applying mechanism 40C includes a first laser oscillator 411 and a second laser oscillator 412 as the laser oscillator 41C for oscillating a pulsed laser. The first laser oscillator 411 and the second laser oscillator 412 each include, for example, a laser oscillator adapted to oscillate a pulsed laser with a repetition frequency of 10 MHz to 10 KHz and an average output of 0.1 W. The first laser oscillator 411 and the second laser oscillator 412 are controlled by a control section 100C. In addition, the laser applying mechanism 40C includes: a composing polarization beam splitter 42C adapted to function as polarization plane composing means; an amplifier 43; and a polarization beam splitter 44. Like in the second embodiment, the laser applying mechanism 40C further includes: a beam damper 45 to which a pulsed laser beam having a polarization plane not to be utilized is applied; a reflection mirror 46 adapted to reflect the pulsed laser beam to be utilized; a condenser 47 adapted to condense the pulsed laser beam onto the workpiece (wafer 10) suction held on the chuck table 34; and the like.

A half-wave plate is disposed for at least one of the first laser oscillator 411 and the second laser oscillator 412. This ensures that pulsed laser beams can be applied in a state in which their polarization planes are rotated by 90 degrees from each other. Besides, the first laser oscillator 411 and the second laser oscillator 412 are each provided with an acousto-optic device (AOD) (not illustrated), and the application timings of the pulsed laser beams applied from the first laser oscillator 411 and the second laser oscillator 412 can be accurately controlled by the controller 100C. As a result, for example, after five pulses of a pulsed layer beam of p-polarized light are applied from the first laser oscillator 411 as indicated by (a) in FIG. 4, five pulses of a pulsed laser beam of s-polarized light can be applied from the second laser oscillator 412, at a successive timing, as indicated by (b) in FIG. 4.

The pulsed laser beam of p-polarized light applied from the first laser oscillator 411 to the polarization beam splitter 42C and the pulsed layer beam of s-polarized light applied from the second laser oscillator 412 to the polarization beam splitter 42C are guided to a composing polarization beam splitter 42C, and are composed. As a result, as depicted in FIG. 4, a continuous pulsed laser beam containing the pulsed laser beam of p-polarized light and the pulsed laser beam of s-polarized light is obtained. The thus composed pulsed laser beam is a pulsed laser beam similar to the pulsed laser beam applied from the EOM 42A in the first embodiment. The thus composed pulsed laser beam is guided to the amplifier 43, and is applied to the wafer 10 through an optical path which is the same or similar to that in the first embodiment, whereby laser processing is performed. In the third embodiment, also, like in the first embodiment, the pulsed laser beam incident on the amplifier 43 is not intermittently stopped, and, therefore, accumulation of energy in the amplifier 43 would not occur, and the power of the pulsed laser beam amplified by the amplifier 43 would not be abnormally amplified. Accordingly, application of a pulsed laser beam amplified abnormally, and unsuited for processing of the wafer 10, to the wafer 10 is prevented.

While an example in which the laser applying mechanism 40A to 40C is adopted for the laser processing apparatus 2 has been described in each of the above embodiments, this is not restrictive of the present invention. For example, the laser applying mechanism may be applied to an apparatus for inspecting physical properties of a workpiece, or measuring a surface position of a workpiece, by amplifying a pulsed laser beam and applying the amplified pulsed laser beam to the workpiece.

While the pulsed laser beam of p-polarized light is selected as the pulsed laser beam to be utilized in the above embodiments, this is not limitative of the present invention. For example, a pulsed laser beam of s-polarized light may be utilized, and a pulsed laser beam of p-polarized light may be absorbed by a beam damper disposed in an optical path along which it is guided.

Note that in consideration of the problems to be solved by the present invention, it may be contemplated to adopt a configuration in which a pulsed laser beam oscillated by a laser oscillator is guided as it is to an amplifier and is amplified by the amplifier, after which thinning-out of the pulsed laser beam is conducted using an acousto-optic device (AOD). In this case, however, the pulsed laser beam enhanced in power for being served to processing is thinned out, and, therefore, it is necessary to avoid damage to the AOD or the like. As specific means avoiding the damage, a process may be contemplated in which at the time of guiding the amplified pulsed laser beam to the acousto-optic device (AOD) or the like, the beam is made to be incident on the AOD or the like in an enlarged beam size, for lowering the output density. When the beam is made to be incident in an enlarged beam size, however, a delay of propagation velocity of sound wave in the crystal constituting the AOD or the like leads to worsening of time response, and favorable follow-up of control is not attained in a high repletion frequency range, so that processing quality is instable. The present invention obviates these problems by adopting the above-described configurations.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser applying mechanism having a laser oscillator adapted to oscillate a pulsed laser and to emit a linearly polarized pulsed laser beam, the laser applying mechanism comprising:
   polarization plane composing means selectively composing a pulsed laser beam having a second polarization plane rotated by 90 degrees with respect to a pulsed laser beam having a first polarization plane emitted from the laser oscillator;

an amplifier adapted to amplify a power of the pulsed laser beam composed by the polarization plane composing means; and pulsed laser beam extracting means configured to receive the pulsed laser beam amplified by the amplifier and extracting a pulsed laser beam having a polarization plane to be utilized, from the pulsed laser beam having the first polarization plane and the pulsed laser beam having the second polarization plane which are contained in the pulsed laser beam amplified by the amplifier; and a condenser configured to receive and condense the pulsed laser beam having a polarization plane to be utilized, to a wafer.

2. The laser applying mechanism according to claim 1, wherein the polarization plane composing means includes an electro-optical modulator, the pulsed laser beam emitted from the laser oscillator is selectively converted into the pulsed laser beam having the second polarization plane by the electro-optical modulator, to synthesize the pulsed laser beam having the first polarization plane and the pulsed laser beam having the second polarization plane, the pulsed laser beam extracting means includes a polarization beam splitter, and wherein the polarization beam splitter extracts the pulsed laser beam having the first polarization plane and the pulsed laser beam having the second polarization plane in forms of p-polarized light and s-polarized light.

3. The laser applying mechanism according to claim 1, wherein the pulsed laser beam extracting means includes a cubic-type polarization beam splitter, and wherein the polarization beam splitter extracts the pulsed laser beam having the first polarization plane and the pulsed laser beam having the second polarization plane in forms of p-polarized light and s-polarized light.

4. The laser applying mechanism according to claim 2, further comprising a beam damper configured to receive the s-polarized light from the polarization beam splitter.

* * * * *